US012612504B2

(12) United States Patent
Schlummer et al.

(10) Patent No.: US 12,612,504 B2
(45) Date of Patent: Apr. 28, 2026

(54) WOVEN FIBER STRUCTURE MAINTENANCE DURING THERMOPLASTIC POLYMER DISSOLUTION

(71) Applicant: Fraunhofer-Gesellschaft, Munich (DE)

(72) Inventors: Martin Schlummer, Freising (DE); Luis Hoffmann, Freising (DE)

(73) Assignee: FRAUNHOFER-GESELLSCHAFT ZUR FÖRDERUNG DER ANGEWANDTEN FORSCHUNG E.V., Freising (DE)

( * ) Notice: Subject to any disclaimer, the term of this patent is extended or adjusted under 35 U.S.C. 154(b) by 1108 days.

(21) Appl. No.: 17/674,802

(22) Filed: Feb. 17, 2022

(65) Prior Publication Data

US 2023/0257547 A1 Aug. 17, 2023

(51) Int. Cl.
*C08J 11/20* (2006.01)
*B29B 17/02* (2006.01)

(52) U.S. Cl.
CPC .............. *C08J 11/20* (2013.01); *B29B 17/02* (2013.01)

(58) Field of Classification Search
CPC .. C08J 11/20; B29B 17/02; B29B 2017/0293; B29K 2105/08; Y02W 30/62
See application file for complete search history.

(56) References Cited

FOREIGN PATENT DOCUMENTS

WO WO-2018009436 A1 * 1/2018 ........... B01D 29/705

* cited by examiner

*Primary Examiner* — Thuan D Dang
(74) *Attorney, Agent, or Firm* — CRGO Global; Steven M. Greenberg

(57) ABSTRACT

Embodiments of the present invention address deficiencies of the art in respect to composite recycling and provide a novel and non-obvious dissolution tank, recycling system and recycling process adapted for the separation of fibers during composite dissolution. In an embodiment of the invention, a dissolution tank adapted for composite dissolution and fiber separation includes a tank, a pair of opposing perforated structures disposed within the tank, an actuator coupled to the perforated structures and configured to drive the pair of structures towards one another, and a control system programmed to direct the actuator to drive the structures towards one another responsive to a determination that a composite part disposed between the structures is transforming from a rigid state.

5 Claims, 2 Drawing Sheets

WOVEN FIBER STRUCTURE MAINTENANCE DURING THERMOPLASTIC POLYMER DISSOLUTION

BACKGROUND OF THE INVENTION

Field of the Invention

The present invention relates to the field of recycling fiber reinforced composites and more particularly to the dissolution of thermoplastics and solvolysis of thermosets containing fibers.

Description of the Related Art

Plastic recycling is the process of recovering scrap or waste plastic and reprocessing the material into useful products. The nature of plastic recycling depends upon the type of plastic itself. Opposite to a thermoset plastic, a thermoplastic, or thermosoftening plastic, is a plastic polymer material that becomes pliable or moldable at a certain elevated temperature and solidifies upon cooling. Recycling of thermoplastics includes many benefits such as provision of raw materials for manufacturing industry, reduced environmental threat to humans since it is non-biodegradable, minimized incineration and landfill issues, less energy consumption for sustenance, and it serving as a source of income and providing job opportunity.

There are several methods for recycling thermoplastics including primary recycling, mechanical recycling and chemical recycling. In respect to chemical recycling, waste plastics serve as raw materials and convert into monomer or other products through decomposition and depolymerization of feedstock with the use of thermal energy or a catalyst. Solvolysis is a specific chemical recycling route that employs solvents to depolymerize thermosets and targets at the recovery of monomers and oligomers. Upon degradation, thermosets become liquid and monomers and oligomers can be recovered from the solvent. Solvent-based recycling of thermoplastic polymers can be achieved through a physical dissolution process that does not degrade the polymer chain with the immersion of the thermoplastic into a solvent such as benzene, chlorobenzene, trichloroethylene, toluene, and xylene, or else, after the separation of undissolved matter for example through filtration, a recycled polymer can be recovered from the solution.

Of import, modern plastic composites made of thermosets or thermoplastics incorporate fibers such as glass or carbon fibers to provide strength and shape to the part. As such, simply subjecting the thermoplastic part to physical dissolution or a thermoset to chemical solvolysis in a recycling tank in the presence of a solvent ignores the incorporation of the fibers within the dissolving part and results in the rag tag, disorganized collection of the fibers at the base of the tank. Consequently, not only can pipeline blockages result in the tank itself, but the fibers of the woven structure then become waste product unable to be recycled. As such, the recycling process for the thermoplastic part will have been defeated.

BRIEF SUMMARY OF THE INVENTION

Embodiments of the present invention address deficiencies of the art in respect to thermoset and thermoplastic recycling and provide a novel and non-obvious dissolution unit, recycling system and recycling process adapted for the separation and preservation of fibers contained within a thermoplastic part during thermoplastic dissolution. In an embodiment of the invention, a dissolution unit adapted for a) thermoplastic dissolution or b) thermoset solvolysis and fiber separation includes a tank, a pair of opposing support frames, grids, or perforated plates disposed within the tank, an actuator coupled to the plates and configured to drive the pair of plates towards one another, and a control system programmed to direct the actuator to drive the plates towards one another responsive to a determination that a thermoplastic part disposed between the plates is dissolving from a rigid state.

In one aspect of the embodiment, the tank additionally includes an agitator adapted to agitate a liquid solvent disposed within the tank. In another aspect of the embodiment, the actuator is a threaded shaft perpendicularly extending through a complimentarily threaded bolt disposed within at least one of the plates. In yet another aspect of the embodiment, the tank additionally includes a resistance sensor transmitting a signal to the control system in response to sensing a lessening of resistance to the actuation of the plates, the lessening of resistance indicating a dissolving of the part from the rigid state.

In another embodiment of the invention, a thermoplastic recycling system includes a dissolution tank configured to dissolve a thermoplastic part while maintaining all fibers contained therein in a common plane, a filtration tank, a purification tank and a drying tank. In this regard, the dissolution tank includes a pair of opposing support frames, grids, or perforated plates, an actuator coupled to the plates and configured to drive the pair of plates towards one another, and a control system programmed to direct the actuator to drive the plates towards one another responsive to a determination that a thermoplastic part disposed between the plates is dissolving from a rigid state.

In even yet another embodiment of the invention, a method for extracting fibers arranged in a single plan during dissolution of a thermoplastic or solvolysis of a thermoset, respectively containing the fibers, includes arranging different composite parts in a single layer on a top surface of a bottom plate within a tank and loading the tank with a solvent. The method also includes directing a control system affixed to the tank to actuate a movement of the bottom plate/frame/grid towards a top plate/frame/grid after a lapse of a threshold period of time, for instance thirty minutes, until it is determined that the thermoplastic parts have contacted a bottom surface of the top plate, to respond to a lapse of a threshold amount of time by re-actuating movement of the bottom plate towards the top plate until a threshold resistance to the movement of the bottom plate is detected and to repeating the re-actuation each time the threshold resistance is no longer detected until a termination directive is received.

In one aspect of the embodiment, the control system further activates an agitator in the tank agitating the solvent before actuating the movement of the bottom plate towards the top plate. In another aspect of the embodiment, the control system loads into memory a previously stored breakdown curve comparing a time during which a different thermoplastic part had previously been present in the tank to a degree of dissolution of the thermoplastic part. Optionally, the previously stored breakdown curve is computed based upon an average of crowdsourced data of different thermoplastic parts that had previously been present in different tanks in comparison to an average of a degree of dissolution of each of the different thermoplastic parts.

Thereafter, a degree of dissolution is monitored for the different thermoplastic parts in the single layer on the top surface of the bottom plate within the tank at different times so that a contemporaneous breakdown curve can be computed based upon the monitored degree of dissolution and the different times. Consequently, a deviation can be detected between the contemporaneous breakdown curve and the previously stored breakdown curve, and an alert displayed in the control system. In another embodiment of the invention, nozzles are integrated in the dissolution tank to remove remaining polymer solution from the woven structure after the dissolution of the polymer matrix. The nozzles can be mounted on all sides of the vessels depending on the shape of the processed fiber reinforced polymer sample.

In yet another embodiment of the invention, a method for extracting fibers arranged in a single plan or dedicated shape during solvolysis of a thermoset containing the fibers includes arranging different thermoset parts in a single layer on a top surface of a bottom plate within a tank, loading the tank with a solvent and directing a control system affixed to the tank to actuate a movement of the bottom plate towards a top plate until it is determined that the thermoplastic parts have contacted a bottom surface of the top plate, to respond to a lapse of a threshold amount of time by re-actuating movement of the bottom plate towards the top plate until a threshold resistance to the movement of the bottom plate is detected and to repeating the re-actuation each time the threshold resistance is no longer detected until a termination directive is received. In one aspect of the method, the control system further activates an agitator in the tank agitating the solvent before actuating the movement of the bottom plate towards the top plate. In another aspect of the method, the threshold period of time is thirty (30) minutes.

In yet another aspect of the method, the method additionally includes loading into memory of the control system, a previously stored breakdown curve comparing a time during which a different thermoplastic part had previously been present in the tank to a degree of solvolysis of the thermoplastic part, monitoring a degree of solvolysis of the different thermoplastic parts in the single layer on the top surface of the bottom plate within the tank at different times, computing a contemporaneous breakdown curve based upon the monitored degree of solvolysis and the different times, detecting a deviation between the contemporaneous breakdown curve and the previously stored breakdown curve and displaying an alert in the control system. As well, optionally, the previously stored breakdown curve is computed based upon an average of crowdsourced data of different thermoset parts that had previously been present in different tanks in comparison to an average of a degree of dissolution of each of the different thermoplastic parts.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for the solvent-based recycling of a thermoplastic or for the solvolysis of a thermoset while maintaining the fibers therein within a common shape. In accordance with an embodiment of the invention, a dissolution tank within a recycling system is outfitted with opposing perforated structures, such as plates, frames or grids, which are adapted to receive the composite parts to be recycled and to be driven together as the parts dissolve in a solvent in the tank. The rate at which the structures are driven together can depend upon a sensing of the dissolution of the plastic parts so that at the conclusion of the dissolution processes, the fibers contained within the composite parts remain on the bottom surface of a bottom one of the structures within a uniform shape or plane. Consequently, the fibers can be retrieved from the tank and recycled into a new composite part.

Figure 1:
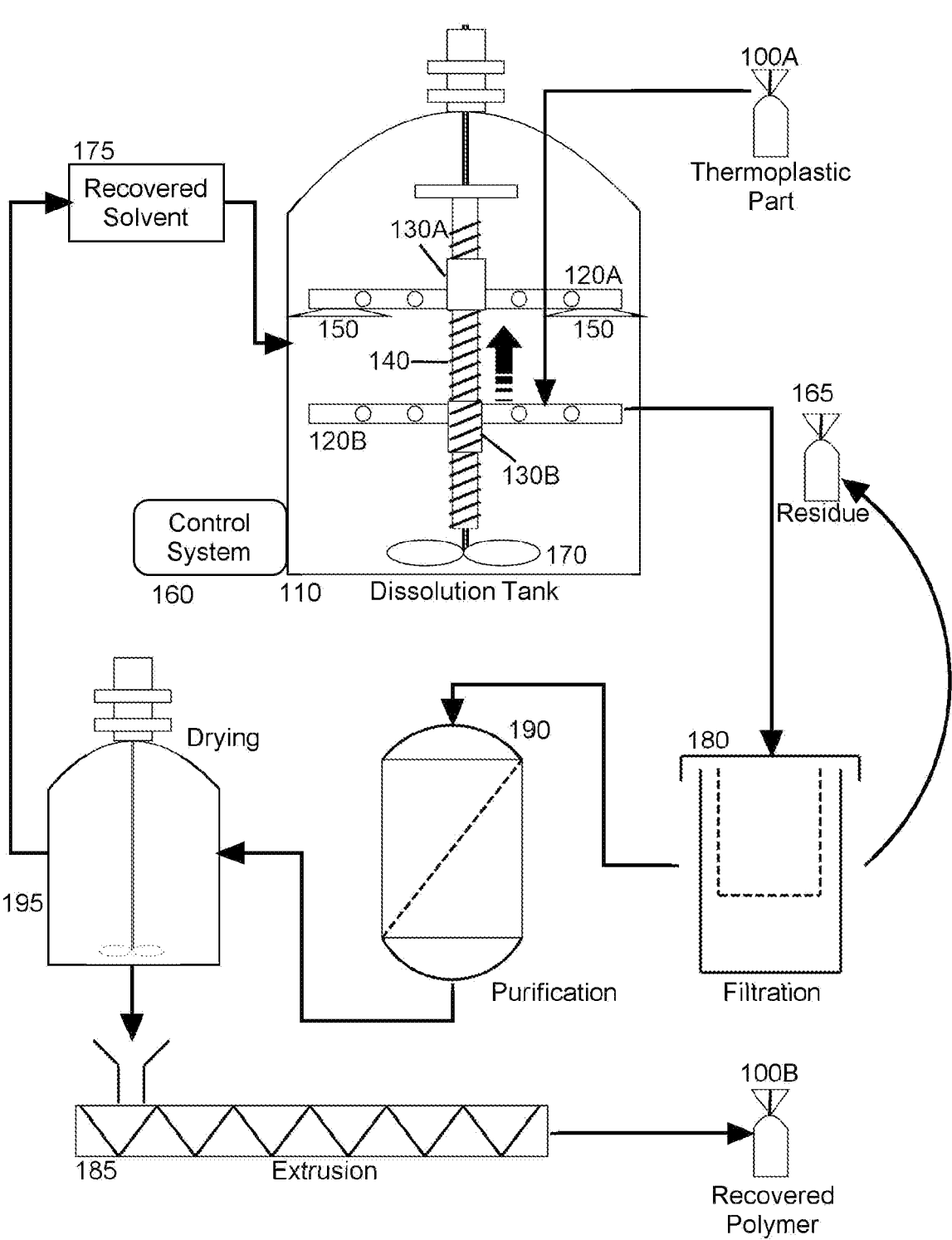
FIG. 1 is schematic illustration of a recycling system adapted to dissolve a composite part while maintaining all fibers contained therein in a common plane; and, FIG. 2 is a flow chart illustrating a process for extracting fibers arranged in a single plan during dissolution of a thermoplastic containing the fibers includes arranging different thermoplastic parts in a single layer on a top surface of a bottom plate within a tank and loading the tank with a solvent.

In further illustration, FIG. 1 schematically shows a thermoplastic recycling system adapted to dissolve a composite part, such as a thermoplastic or thermoset part while maintaining all fibers contained therein in a common plane or shape. The system includes a dissolution tank 110 into which a solvent 175 is placed along with one or more thermoplastic parts 100A so as to recycle the thermoplastic parts 100A. The dissolution tank 110 also includes an agitator 170 or recirculation pump adapted to create a flow of the solvent 175 whilst the solvent 175 is present in the dissolution tank 110. Of import, the dissolution tank 110 also includes a pair of opposing structures 120A, 120B, such as plates, frames or grids, that are perforated so as to allow the solvent 175 to flow therethrough. The opposing structures 120A, 120B are adapted to be actuated in movement towards one another, either by actuating the bottom structure 120B towards the upper structure 120A, by actuating the upper structure 120A towards the bottom structure 120B, or by actuating both of the structures 120A, 120B towards one another.

In an exemplary aspect of the embodiment, the bottom structure 120B has a threaded insert 130B configured to receive a complementary threaded shaft 140 passing through a channel 130A defined in the upper structure 120A, which is fixed, so that the axial rotation of the shaft 140 causes the bottom structure 120B to move towards the upper structure 120A. Optionally, resistance sensors 150 are affixed to either or both of a bottom surface of the upper structure 120A, and a top surface of the bottom structure 120B. The resistance sensors 150 are adapted to sense when an attempt to motivate the structures 120A, 120B towards one another become threshold inhibited owing to a rigid obstruction placed therebetween.

A control system 160 is coupled to the dissolution tank 110 and includes a processor and memory into which program instructions are stored and by which the program instructions are executed. The program instructions are enabled when executing in the control system 160 to actuate the movement of the structures 120A, 120B towards one another while the composite part 100A rests on the top surface of the bottom plate 120B until the resistance sensors 150 indicate a threshold resistance to further movement of the structures 120A, 120B owing to the rigidity of the composite part 100A contacting the bottom surface of the upper structure 120A. The program instructions further are enabled to monitor the resistance sensors 150 such that as the composite part 100A loses its rigidity due to the action of the solvent 175 upon the composite part 100A, the movement of the structures 120A, 120B can be re-actuated until a threshold resistance is once again reported by the resistance sensors 150.

Once the polymeric fraction of the composite part 100A has been completely dissolved within the dissolution tank 110, the resulting material is drained from the dissolution tank 110 and placed into a filtration tank 180 while the fibers of the composite part 100A remain on the top surface of the bottom structure 120B. The fibers may then be removed and re-used while the resulting material drained from the In case of treating a thermoset/fiber composite, the degraded thermosets are drained from dissolution tank 110 and are placed into the filtration tank 180 and subjected to a filtration process before being separated from residue 165 able to be disposed of, with the remaining material moving into a purification tank 190 for purification, and finally into a drying tank 195 in which the solvent 175 is separated from monomers and oligomers ready for reuse in the dissolution tank 110. Monomers and oligomers are drained from the drying tank and used for polymer production elsewhere.

Figure 2:
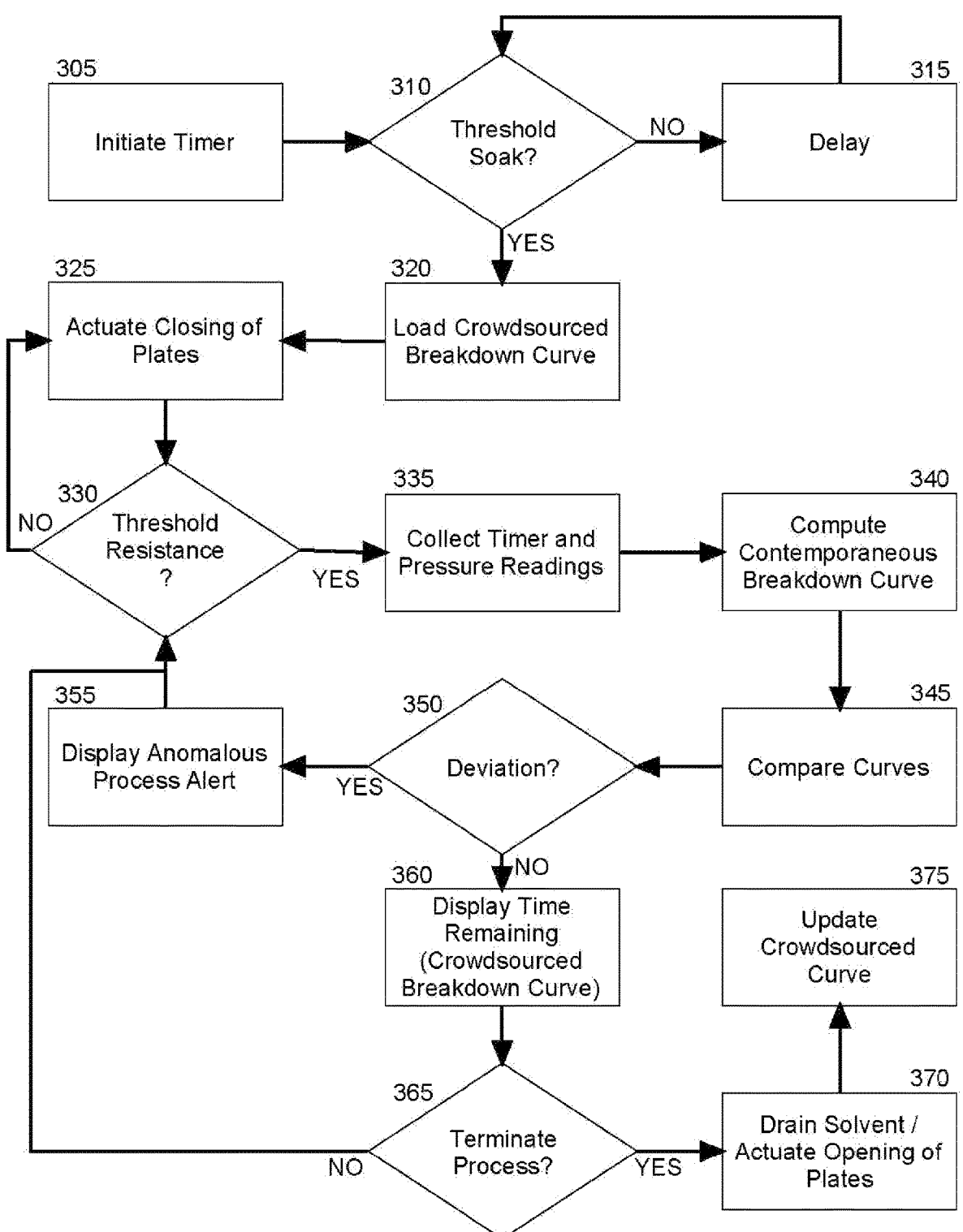

In further illustration of the operation of the control system 160, FIG. 2 is a flow chart illustrating a process for extracting fibers arranged in a single plan during dissolution of a thermoplastic containing the fibers includes arranging different composite parts, either thermoplastic of thermoset, in a single layer on a top surface of a bottom plate within a tank and loading the tank with a solvent. Beginning in block 305, a timer is initiated during which the thermoplastic part is to soak in the solvent while resting on a top surface of the bottom plate within the dissolution tank. In decision block 310, if it is determined that a threshold period of time, for instance 30 minutes, has not lapsed, a delay is incurred in block 315. But, otherwise, the process continues through block 320.

In block 320, a crowdsourced breakdown curve is loaded into memory that includes an average of crowdsourced data correlating to the stage of chemical breakdown of a plastic part at different lapsed times during the chemical recycling process. Then, in block 325, the movement of the plates may be actuated towards one another and in decision block 330, it may be determined if a threshold resistance to this movement has been encountered indicting a corresponding rigidity of the composite part disposed between the plates. If not, the movement of the plates towards one another continues, but otherwise, in block 335, measurements can be retrieved in terms of the time at which the measurements can be taken, and the force imparted upon composite part in the movement of the plates towards one another. Other measurements can be retrieved including a chemical composition of the solvent in proximity to the thermoplastic part so as to indicate a stage of chemical breakdown of the thermoplastic part.

In block 340, a contemporaneous breakdown curve can be constructed based upon the retrieved measurements and, in block 345, the contemporaneous breakdown curve may be compared to the crowdsourced breakdown curve in order to identify a significant deviation. In decision block 350, if a threshold deviation is detected, an alert may be displayed in the control system. But otherwise, in block 360, an estimated time remaining in the dissolution process may be determined based upon the contemporaneous lapsed time during which the thermoplastic part has been present within the solvent in the dissolution tank and the estimated time to completion reflected from that same lapsed time in the crowdsourced breakdown curve.

In decision block 365 it is determined whether or not the dissolution process has completed leaving the fiber in the single plane of the bottom plate. If not, the process can repeat through decision block 330 in which it is determined if the threshold resistance no longer remains so as to indicate a further breakdown of the plastic part and the necessity to re-actuate the movement of the plates towards one another. However, in decision block 365, if it is determined that the process should terminate, in block 370 the solvent is then drained from the dissolution tank and in block 375, the data from the contemporaneous breakdown curve is then combined with the data from the crowdsourced breakdown curve so as to update the crowdsourced breakdown curve.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "include", "includes", and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A composite recycling system comprising:

a dissolution tank configured to dissolve a thermoplastic part, or to degrade a thermoset part into monomers and oligomers, a pair of opposing perforated structure which are adapted to receive the thermoplastic part and to be driven together as the part dissolves in a solvent in the tank, the driving together maintaining all fibers contained in the tank in a common plane or shape within the tank;

a filtration tank;

a purification tank;

a drying tank; and, a separation tank adapted to recover the solvent.

2. The system of claim 1, wherein the dissolution tank comprises:

an actuator coupled to the pair of opposing perforated structures and configured to drive the pair of perforated structures towards one another; and, a control system programmed to direct the actuator to drive the pair of opposing perforated structures towards one another responsive to the determination that a thermoplastic part disposed between a pair of opposing perforated structures is dissolving from a rigid state.

3. The system of claim 1, wherein the dissolution tank further comprises:

an agitator adapted to agitate a liquid solvent disposed within the tank.

4. The system of claim 2, wherein the actuator is a threaded shaft perpendicularly extending through a complimentarily threaded bolt disposed within at least one of the pair of opposing perforated structures.

5. The system of claim 2, wherein the dissolution tank further comprises a resistance sensor transmitting a signal to the control system in response to sensing a lessening of resistance to the actuation of the pair of opposing perforated structures, the lessening of resistance indicating a dissolving of the thermoplastic part from the rigid state.

* * * * *